MAGNETIC AMPLIFIER CIRCUITS WITH FEEDBACK

Filed April 5, 1955 2 Sheets-Sheet 1

INVENTORS
RICHARD W. SPENCER
THEODORE H. BONN
BY
Charles C. English
AGENT

MAGNETIC AMPLIFIER CIRCUITS WITH FEEDBACK

Filed April 5, 1955 2 Sheets-Sheet 2

INVENTORS
RICHARD W. SPENCER
THEODORE H. BONN
BY Charles C. English
AGENT

United States Patent Office 2,812,449

Patented Nov. 5, 1957

2,812,449

MAGNETIC AMPLIFIER CIRCUITS WITH FEEDBACK

Richard W. Spencer and Theodore H. Bonn, Philadelphia, Pa., assignors, by mesne assignments, to Sperry Rand Corporation, New York, N. Y., a corporation of Delaware Application April 5, 1955, Serial No. 499,284

16 Claims. (Cl. 307—88)

The present invention relates to magnetic amplifier circuits and more particularly to magnetic amplifiers incorporating feedback.

Carrier type magnetic amplifiers are well known in the prior art and assume numerous and diverse forms. A typical embodiment may comprise a pair of magnetic cores carrying a pair of power windings, a pair of rectifiers connected similarly to the power windings and a power transformer coupling a source of carrier potential to the circuits including the rectifiers and power windings. A load impedance is normally connected to the power winding circuits, and the cores carry one or more signal windings coupled to a source of signal potential. The windings on the respective cores may be so interconnected that in the normal course of operation energy coupled to one of the cores during a half cycle of carrier potential is also coupled to the other core to condition the latter preparatory to the coupling of power thereto in the next half cycle of carrier potential. The embodiment just described is a full wave carrier type self-saturating magnetic amplifier. Carrier type magnetic amplifiers are also found in single core embodiments and in other multi-core embodiments, such as the three phase carrier type amplifier.

As is known in the art, the amplifier may be adjusted so that in the absence of a signal input thereto, the output voltage will be a minimum. For optimum operation the amplitude of the carrier potential may be adjusted so that each core will traverse its entire hysteresis loop during one half cycle of carrier potential. In addition, it is often desirable to include feedback provisions in such amplifiers to stabilize the output thereof, to permit the device to exhibit plural stable states, to control the amplification of the device, to change the output impedance and/or input impedance, and to provide various other specific functions. The embodiments of the present invention include means for introducing such feedback into the magnetic amplifiers, and the principles of the invention are applicable broadly to both single core and multicore amplifiers. The invention includes both positive and negative feedback arrangements and in one of its embodiments includes a magnetic amplifier incorporating negative feedback with a feedback factor of substantially unity so that the amplifier has the characteristics of a cathode follower vacuum tube circuit.

Accordingly, a primary object of the invention is to provide novel magnetic amplifier circuits.

A further object of the invention is to provide unique magnetic amplifier circuits incorporating feedback.

Another object of the invention is to provide magnetic amplifiers including means for introducing a desired amount of positive or negative feedback.

An addtitional object of the invention is to provide novel magnetic amplifier circuits wherein the input and output are so interconnected as to produce negative or positive feedback in desired amounts.

Still another object of the invention is to provide a magnetic amplifier having the characteristics of a cathode follower circuit.

The foregoing objects of the invention may be realized by utilizing one or more magnetic cores coupled to a source of carrier potential and provided with one or more signal or control windings suitably interconnected with an output circuit including a load impedance. The objects of the invention will become more readily apparent from the following detailed description of the invention taken in conjunction with the accompanying drawings, wherein.

Figure 1:
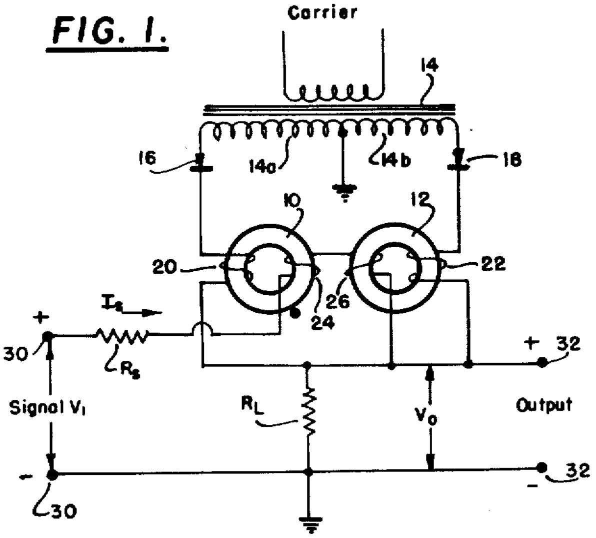
Figure 1 is a circuit diagram of a two core or full wave carrier type magnetic amplifier connected according to the principles of the invention so as to have the characteristics of a cathode follower circuit.

Referring to Figure 1 of the drawings, reference numerals 10 and 12 designate, respectively, a pair of magnetic cores, which preferably, but not necessarily, are formed from a material exhibiting a substantially rectangular hysteresis loop. Such cores may be made from a variety of materials, among which are the various types of ferrites and various kinds of magnetic tapes, including Orthonik and 4–79 Molypermalloy. These materials may be given different heat treatments to produce different desired properties. In addition, the cores may be constructed in a number of geometrical configurations, including both closed and open paths. For instance, cup-shaped cores, strips of material, or toroidal cores may be used. It is to be understood, however, that the present invention is not limited to any specific core configuration nor to a specific hysteretic characteristic therefor.

Power may be supplied to the amplifier from a low impedance carrier frequency supply connected to the primary winding of a power transformer 14, and the secondary winding of the said transformer is coupled to the respective cores through a pair of rectifiers 16, 18, poled as shown. The center tap of the secondary winding of the power transformer may be grounded as illustrated. Rectifiers 16 and 18 may be constituted by any of the conventional rectifiers, including crystal diodes and vacuum tubes.

Core 10 carries a power winding 20, one end of which is connected to rectifier 16 and the other end of which is connected to a load impedance $R_L$. Core 12 similarly carries a power winding 22 connected to rectifier 18 and to the load impedance $R_L$ in the same manner. One end of the load impedance may be grounded, as indicated, to complete a pair of series circuits, including respectively the halves of the power transformer secondary winding **14*a* and 14*b*, rectifiers 16, 18, power windings 20, 22** and the load impedance $R_L$.

Cores 10 and 12 also carry signal windings 24, 26, which may be separate coils as illustrated or one continuous coil wound on both cores. The signal windings are connected in series, and one end of coil 24 is connected to one of signal input terminals 30, to which may be applied a controlling input signal, ordinarily of a frequency substantially less than that of the carrier frequency. The input circuit includes a resistance $R_S$, which represents resistance of the source, wiring, coils, and any physical resistor used. The series resistance illustrated implies a voltage source at terminals 30. It will be appreciated that a shunt impedance could be employed in conjunction with a current source. These arrangements are equivalent if $e(t)=i(t)R_S$, where $e(t)$ is the voltage source and $i(t)$ the current source.

One end of signal winding 26 is connected to the output circuit of the amplifier at the upper or high potential end of the load impedance $R_L$. Output terminals 32 may be connected across the load impedance, as illustrated, and the output potential may be filtered to remove carrier frequency components. The term "carrier frequency" as employed herein denotes a frequency in excess of approximately 3 to 5 times the intelligence or signal frequency, as is usually understood in the electrical arts. While no sharp line can be designated, of course, suffice it to say that the carrier frequency is sufficiently higher than the highest intelligence frequency to allow the carrier and intelligence frequencies to be readily separated by a filter circuit.

Cores 10 and 12 may be biased from any suitable source of current (not shown) which may be connected to the input or output circuit of the amplifier or coupled to the cores by separate bias windings, as is well known in the prior art.

Figure 2:
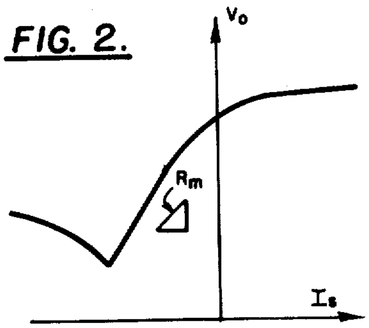
Figure 2 is an explanatory graph.

For the purposes of the description of the present invention, it will be assumed that an increment of input current $I_S$ flowing into the signal or control windings via winding 24 produces a positive increment of output voltage $V_O$. All voltages and currents represent incremental quantities at the frequency of the signal or control potential $V_I$. Figure 2 represents a graph of the output voltage $V_O$ versus the input current $I_S$ for an amplifier with the end of signal winding 26 connected to ground rather than to the upper end of the load impedance as illustrated in Figure 1. The slope of this curve may be defined as $R_M$ and is equal to the derivative of the output voltage with respect to the input current or $d(V_O)/d(I_S)$. The voltage gain of such a magnetic amplifier is equal to $R_M/R_S$, while the voltage gain for the cathode follower circuit of Figure 1 equals $R_M/(R_S+R_M)$. Again, while the input resistance for the amplifier characterized in Figure 2 is merely $R_S$, the input resistance of the cathode follower circuit is $R_S+R_M$. If the output resistance of the amplifier characterized in Figure 2 is defined as $R_O$, the output resistance of the "cathode follower" arrangement of the present invention is equal to $R_O R_S/(R_S+R_M)$.

Referring now to the operation of the circuit of Figure 1, let us initially assume that core 10 is at its plus remanence operating point, and that core 12 is at its minus remanence operating point. When the right-hand end of the secondary of transformer 14 becomes positive, this positive potential will be applied to the series circuit consisting of rectifier 18, winding 22, and load $R_L$. Since the magnetizing current is small (core 12 is unsaturated), most of the potential drop appears across winding 22, and flux increases toward positive saturation. This increase in flux induces a voltage in winding 26, which voltage is applied to the series circuit consisting of winding 24, resistance $R_S$, and signal source V. If voltage $V_I$ is equal to the minimum output voltage $V_O$ (no net voltage applied to input circuit), and there is no voltage appearing across resistance $R_S$, all the induced voltage in winding 26 is applied to winding 24. Under these conditions, while the flux in core 12 increases from minus remanence to plus remanence, the flux in core 10 decreases from plus remanence to minus remanence. During this time, magnetizing current to revert core 10 is supplied from the bias source mentioned above, so that there is no current flowing in the signal circuit. When the carrier voltage polarity reverses, a similar process takes place, but with the roles of the two cores interchanged. Now most of the potential applied to the series circuit consisting of rectifier 16, winding 20, and load $R_L$ appears across winding 20. Thus, during both half cycles, the voltage across the load $R_L$ is small in the absence of an input signal ($V_I=0$).

If, now, a positive signal should be applied to input terminals 30, this signal voltage $V_I$ will oppose the reverting effects of the voltages applied to coils 24 and 26 which occur due to induction of potential in the other coil, and cores 10 and 12 will be driven to saturation on alternate half cycles by the positive voltage pulses applied to coils 20 and 22 by the carrier supply. Because the signal voltage $V_I$ opposes the reversion of the cores, during each half cycle, the flux in one core decreases less than the flux in the other increases. In each half cycle, therefore, the core being set toward plus saturation reaches plus remanence in less time than did the other core during the preceding half cycle. Since the winding impedance becomes lower as positive remanence is reached, load current increases to nearly its full value earlier and earlier in the half cycle until the output voltage $V_O$ equals the signal voltage $V_I$ (or reaches full output, whichever occurs first). The potential produced across the load is coupled back to the input circuit by virtue of the connection of the signal coils to the high potential end of the load and will thus produce a negative or degenerative feedback.

Figure 3:
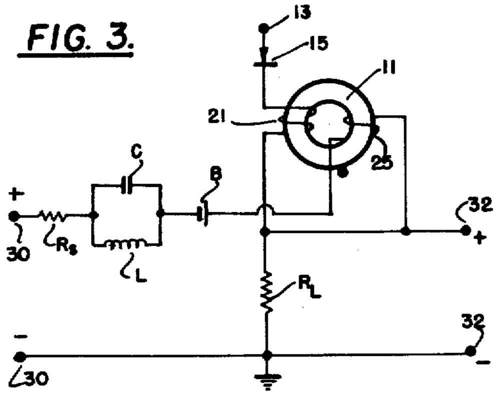
Figure 3 is a circuit diagram of a single core embodiment connected as a "cathode follower."

The principles of the invention set forth with respect to Figure 1 are also applicable to single core amplifiers, and to other multi-core amplifiers. Figure 3 illustrates the former, including a single core 11 having a power winding 21, coupled to a source of carrier potential at terminal 13 by rectifier 15. One end of power winding 21 connects to the upper or high potential end of the load impedance as in Figure 1. A signal or control potential at terminals 30 is coupled to the core by an input coil 25, one end of which is connected to the high potential end of the load impedance. The battery B connected in the input circuit is representative of an auxiliary source which may be employed to revert core 11 during the half cycles of carrier potential when rectifier 15 is non-conductive. Either this or a separate bias current source could be used in the arrangements of Figure 1 or Figure 3. The filter comprising parallel connected inductance L and capacitance C may be inserted in the output circuit and tuned so as to form a high impedance to carrier frequency components thereby to attenuate carrier potentials in the input circuit.

Figure 4:
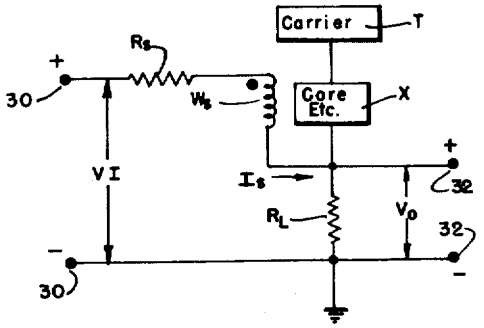
Figure 4 is a simplified circuit diagram of the embodiments of Figures 1 and 3.

Figure 4 is a simplified illustration of the invention embodied in Figures 1 and 3 and indicates that the invention is not restricted to the arrangements of the latter figures.

Box X includes the core or cores and associated power windings, rectifiers, and transformers, as may be necessary to couple the cores to a source of carrier frequency in box T. Winding $W_S$ is representative of the signal winding or windings. Thus, while the principles of the invention described in reference to Figure 1, as well as those to be described hereinafter in connection with Figures 5 through 8, are illustrated by two core embodiments, it will be appreciated that each of such embodiments may be simplified to a diagram such as that illustrated in Figure 4 including any suitable number of cores and the accompanying power circuitry.

The reference characters employed in Figures 5 through 8 designate elements identical with those of Figure 1, except, of course, where new reference characters are required to designate elements differing from those in Figure 1.

Figure 5:
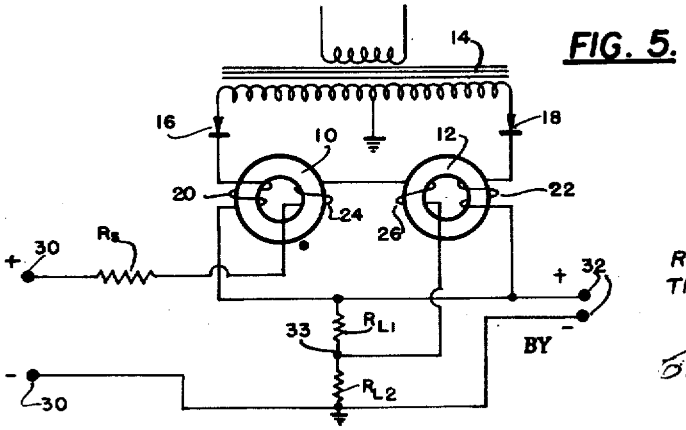
Figure 5 is a circuit diagram of an embodiment incorporating negative feedback with a feedback factor of less than unity.

Figure 5 illustrates an embodiment employing negative feedback with a feedback factor of less than unity. The load impedance is shown as divided into two parts $R_{L1}$ and $R_{L2}$ by a tap 33. The end of signal winding 26 is connected to this tap, instead of to the upper end of the load impedance as in Figure 1. It will be appreciated that tap 33 may be located anywhere along the load impedance so as to provide negative feedback of the desired amount.

Figure 6:
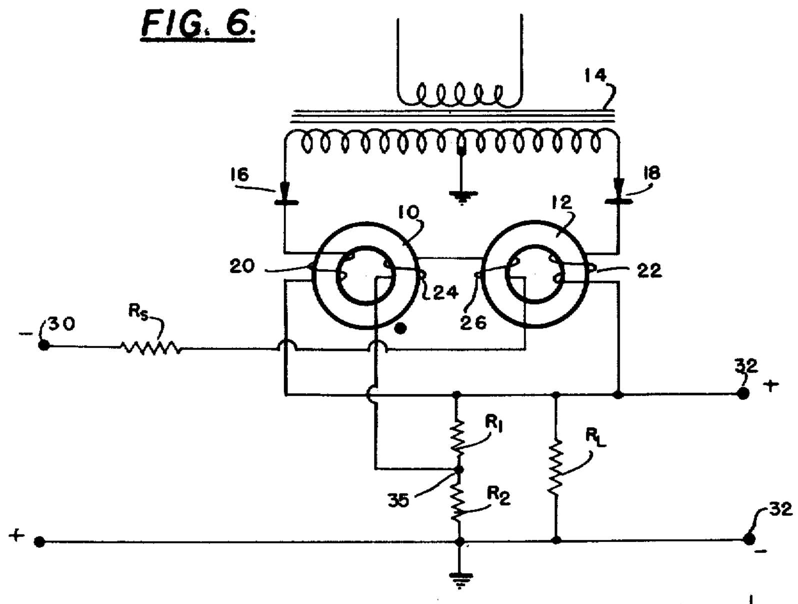
Figure 6 is a circuit diagram of an embodiment incorporating positive feedback.

Figure 6 illustrates an embodiment differing from that of Figure 5 in several respects. First, one end of the signal winding circuit is connected to a tap 35 on a voltage divider comprising impedances $R_1$ and $R_2$. This arrangement may be employed where the load impedance may not be conveniently tapped. Second, the connections of the signal winding circuit are reversed with respect to those of Figure 5, inasmuch as the end of signal winding 24 is connected to tap 35 and the end of signal winding 26 is connected to one of the input terminals 30. These connections thus result in a positive feedback rather than in the negative feedback previously discussed. The amount of feedback is, of course, again determined by the position of tap 35 on the voltage divider $R_1$—$R_2$. It will be noted that the arrangement of Figure 6 also inverts the signal so that the output potential at terminals 32 has a polarity opposite to that of the input potential at terminals 30. If the end of coil 24 were connected to ground, rather than to tap 35, the output would still be inverted, but there would then be no feedback. The arrangement of Figure 6 may be utilized in a suitable flip-flop circuit. For example, a positive pulse applied to upper terminal 30 may be employed to change the amplifier from one stable state to another, while a succeeding negative pulse applied to this terminal may be employed to bring the amplifier back to its initial stable state.

Figures 7, 8:
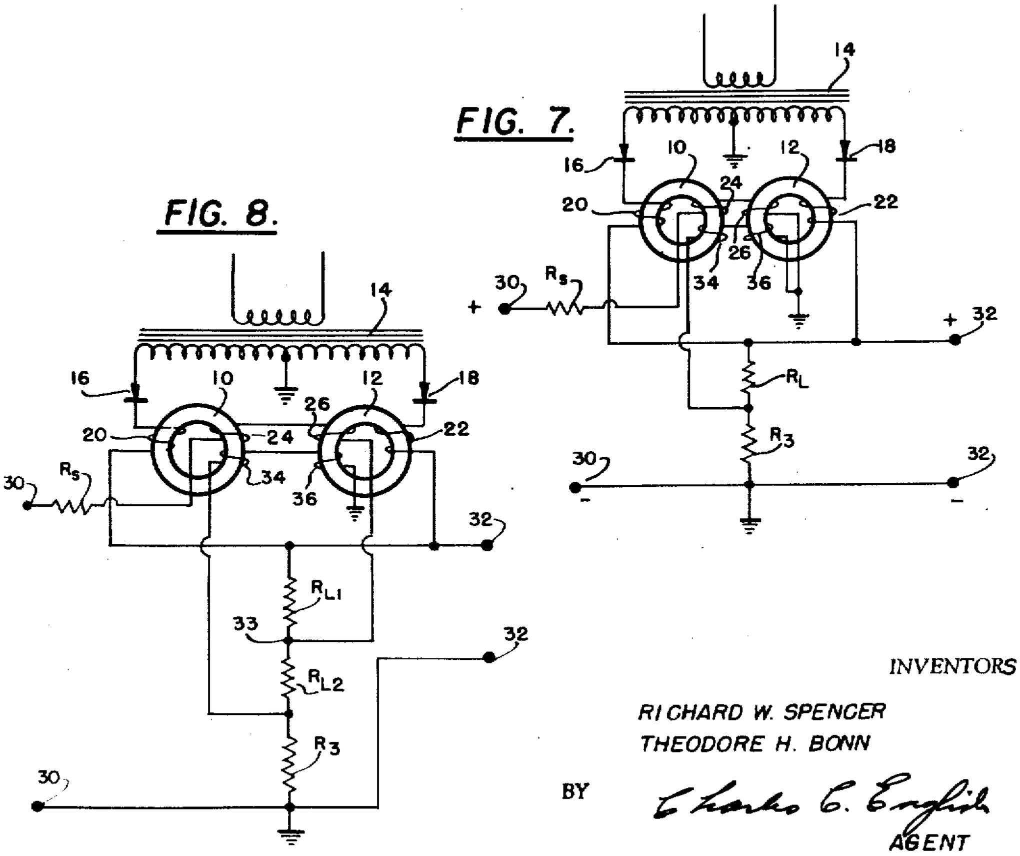
Figure 7 is a circuit diagram of an embodiment incorporating separate feedback windings.
Figure 8 is a circuit diagram of an embodiment incorporating the separate feedback windings of Figure 7 as well as the negative feedback arrangement of Figure 5.

Figure 7 illustrates an embodiment including separate feedback windings 34, 36. The feedback windings may be connected, as shown, across an impedance $R_3$ in series with the load $R_L$; the said feedback windings may also be connected across the load $R_L$, may be connected across a portion of the load, or may be connected in series with the load. The polarity of the feedback windings may again be chosen so as to produce either positive or negative feedback. In the embodiment illustrated, input windings 24 and 26 are not utilized for feedback and one end of winding 26 is grounded accordingly.

In the embodiment of Figure 8, separate feedback windings 34 and 36 are employed in conjunction with a feedback arrangement of the type illustrated in Figure 5. Thus, input winding 26 may be connected to tap 33 on the load impedance. It will be appreciated that separate feedback windings may be employed in conjunction with any of the other embodiments previously described. Both feedbacks may be positive, or negative, or one may be positive and one negative. Moreover, the amount of feedback in each instance may be adjusted individually.

It will be appreciated by those skilled in the art that in general wherever, in the description above, negative feedback is employed, either by connecting one end of the signal winding circuit to a point in the load circuit or by using separate feedback windings, positive feedback of the resistive, capacitive, inductive or combined type may be employed in conjunction therewith. For example, in Figure 5, a capacitor may be connected from the tap of the load impedance to the dotted end of winding 24. Moreover, wherever positive feedback is employed above, negative feedback may be employed in conjunction therewith. In addition, the feedback elements themselves may be purely resistive, inductive, or capacitive, or they may comprise R–C or R–C–L circuits suitably disposed, and under certain circumstances, the distributed capacity between various amplifier components may effect all or a portion of the feedback circuit.

While the invention has been shown and described in a preferred form, it is to be understood that this form is illustrative, not restrictive, of the invention. Many variations will be suggested to those skilled in the art, and such variations which are in accordance with the principles of the invention are intended to fall within the scope of the following claims. It is to be noted that the feedback arrangements set forth may be employed wherever feedback is desirable, and such arrangements are not limited to the particular purposes described.

Having thus described our invention, we claim:

1. In a device of the type described, at least one magnetic core, a source of carrier potential, first winding means coupled to said source and carried by said core for producing a flux in said core in response to said carrier potential, a biasing means permanently coupled to said core for producing a flux therein of a given direction, a source of signal potential, second winding means coupled to the last-mentioned source and carried by said core for producing a flux in said core in response to said signal potential, an output circuit coupled to said first winding means whereby current flowing in said first winding means effects an output current in said circuit, and feedback means coupling said circuit to said core for producing a flux in said core in response to said output current.

2. In a device of the type recited in claim 1, said feedback means comprising said means for producing a flux in response to said signal potential.

3. In a device of the type recited in claim 1, said means for producing a flux in response to said signal potential comprising at least one signal winding, said feedback means comprising at least one separate feedback winding.

4. A magnetic amplifier comprising at least one magnetic core, a source of carrier potential, power coil means coupling said source and said core, a load impedance coupled to said coil means, a biasing means permanently coupled to said core for producing a flux therein of a given direction, a source of signal potential, signal coil means coupling said signal source and said core so as to produce an output potential across said load impedance, and means for coupling back at least a portion of the potential across said load impedance to said core.

5. A magnetic amplifier in accordance with claim 4, the last-mentioned means comprising a conductive connection from said load impedance to said signal coil means, whereby said signal coil means and at least a portion of said load impedance are connected in series with one another across said signal source.

6. A magnetic amplifier in accordance with claim 4, the last-mentioned means comprising a voltage divider connected across said load impedance and a conductive connection from said divider to said signal coil means.

7. A magnetic amplifier in accordance with claim 4, the last-mentioned means comprising separate feedback coil means.

8. A magnetic amplifier comprising at least one magnetic core, a source of carrier potential, means coupling said source and said core for producing a flux in said core in response to said potential, a source of signal potential, means coupling the last-mentioned source and said core for producing a flux in said core in response to said signal potential, a load impedance, means coupling said load impedance and said core for producing a potential across said load in response to said signal potential, and means for producing a feedback flux in said core in opposition to the flux produced in said core by said signal potential and in accordance with substantially the entire potential produced across said load impedance.

9. A magnetic amplifier in accordance with claim 8, said means for producing a flux responsive to said signal potential comprising coil means having one end connected to said signal source, the other end of said coil means being connected to one end of said load impedance and forming said feedback means.

10. A magnetic amplifier comprising at least one magnetic core, a source of carrier potential, power coil means coupled to said core, a load impedance, means connecting said coil means and said impedance in series across said source, a biasing means permanently coupled to said core for producing a flux therein of a given direction, a source of signal potential, signal coil means coupled to said core, and means connecting said signal coil means and at least a part of said load impedance in series across said source of signal potential.

11. A magnetic amplifier comprising at least one magnetic core, a source of carrier potential, means coupling said source and said core for producing a flux in said core in response to said potential, a biasing means permanently coupled to said core for producing a flux therein of a given direction, an impedance, means coupling said impedance and said core for producing a potential across said impedance in response to predetermined flux conditions in said core, a source of signal potential, signal coil means coupled to said core for establishing said conditions, and means connecting said signal coil means and at least a portion of said impedance across said signal source, whereby the flux produced by said signal coil means is dependent upon the sum of said signal potential and the potential across said impedance portion.

12. A magnetic amplifier in accordance with claim 11, said connecting means connecting said signal potential and the potential across said impedance portion in series aiding relationship.

13. A magnetic amplifier in accordance with claim 11, said connecting means connecting said signal potential and the potential across said impedance portion in series opposition.

14. The combination of claim 11 wherein said impedance includes a tap thereon, one end of said signal coil means being connected to one terminal of said signal source, the other end of said signal coil means being connected to said tap, and one end of said impedance being coupled to the other terminal of said signal source.

15. The combination of claim 14 wherein said impedance includes a further tap, and feedback coil means carried by said core and connected between said further tap and one terminal of said signal source.

16. The combination of claim 14 including a further impedance connected in parallel with said first mentioned tapped impedance.

No references cited.

U. S. DEPARTMENT OF COMMERCE

PATENT OFFICE

CERTIFICATE OF CORRECTION

Patent No. 2,812,449

November 5, 1957

Richard W. Spencer et al.

It is hereby certified that error appears in the printed specification of the above numbered patent requiring correction and that the said Letters Patent should read as corrected below.

Column 4, line 47, for "output" read --input--.

Signed and sealed this 11th day of March 1958.

(SEAL)
Attest:
KARL H. AXLINE

Attesting Officer

ROBERT C. WATSON
Commissioner of Patents